Sept. 13, 1932. R. W. HASTINGS ET AL 1,876,924
JOINT FOR ELLIPTICAL SPRINGS
Filed Nov. 11, 1930
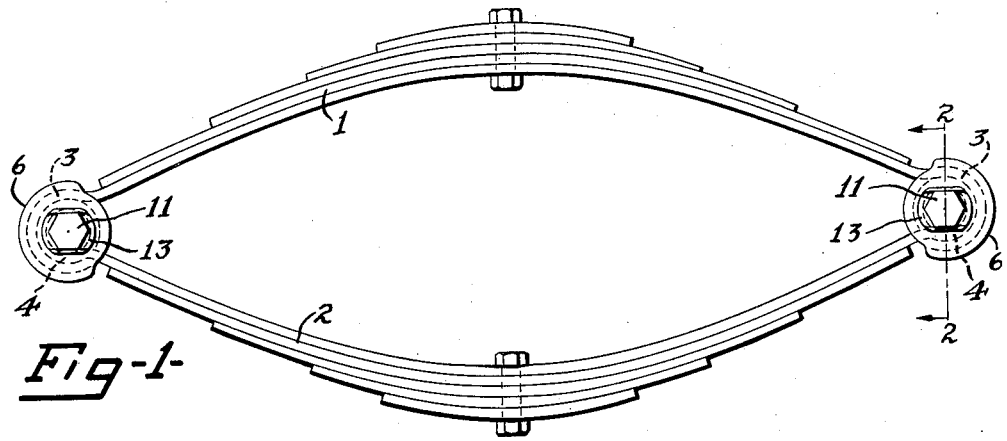
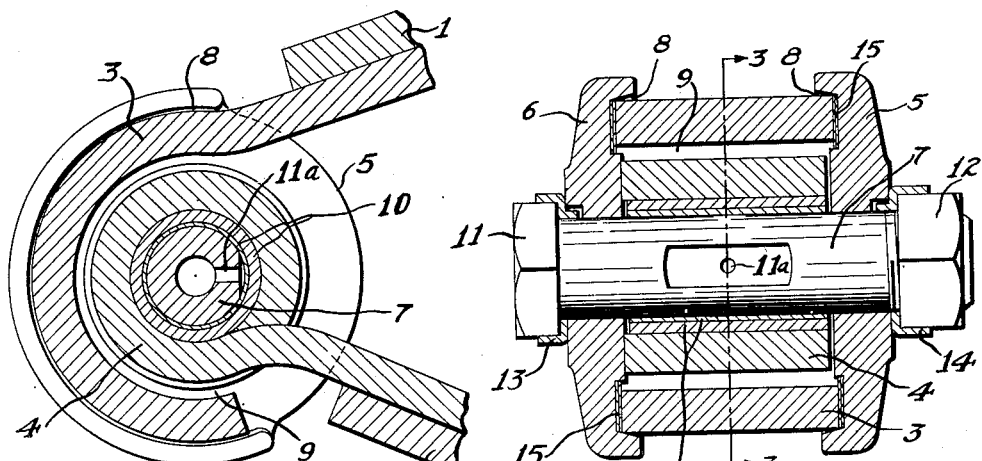
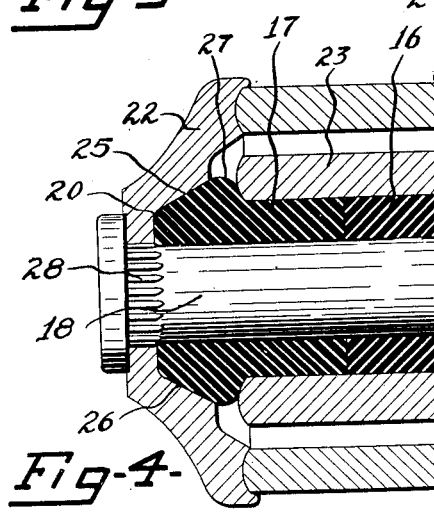
INVENTORS:
Roger W. Hastings
& Mark Harris,
BY
Bodell & Thompson
ATTORNEYS.

Patented Sept. 13, 1932

1,876,924

UNITED STATES PATENT OFFICE

ROGER W. HASTINGS AND MARK HARRIS, OF SYRACUSE, NEW YORK, ASSIGNORS TO FRANKLIN DEVELOPMENT CORPORATION, OF SYRACUSE, NEW YORK, A CORPORATION OF NEW YORK

JOINT FOR ELLIPTICAL SPRINGS

Application filed November 11, 1930. Serial No. 494,961.

This invention relates to elliptical springs such as are used in motor vehicles, whether full, three-quarter or one-half elliptical consisting of upper and lower quarters, and has for its object a particularly simple, economical and efficient joint between the main leaves of the opposing or upper and lower springs of the elliptical formation.

The invention consists in the novel features and in the combinations and constructions hereinafter set forth and claimed.

In describing this invention, reference is had to the accompanying drawing in which like characters designate corresponding parts in all the views.

Figure 1 is an elevation of a full elliptical spring embodying our invention at both ends thereof.

Figure 2 is an enlarged sectional view taken on line 2—2, Figure 1.

Figure 3 is a sectional view on line 3—3, Figure 2.

Figure 4 is a view similar to Figure 2 of a slightly modified form from that shown in Figure 2.

While we have shown the invention as applied to a full elliptical spring, it is obvious that it may be applied only to a half, when the half consists of upper and lower quarters, or three-quarter elliptical spring or any elliptical spring having one or two pivot joints.

1 and 2 designate respectively the opposing, that is, the upper and lower springs, the main leaves of which are provided with concentric eyes 3, 4.

This invention comprises means for supporting the eyes independently of each other or supporting the outer eye so that its weight is off the periphery of the inner eye, or so that the weight supported by the upper spring is transferred to the lower spring through the pin or bolt extending through the eye of the lower spring.

The means for coacting with the outer eye 3 to hold its weight off the periphery of the inner eye comprises clamping members 5, 6 mounted on the pin or bolt 7, which extends axially through the inner eye 4. These members are here shown as discoidal in general form and provided with seats in the form of arcuate grooves 8 in the opposing faces of the members 5, 6, the arcuate grooves being concentric with the pin 7 and being located to hold the outer eye 3 spaced apart from the periphery of the inner eye 4, and providing an intervening space 9. The inner eye has a bearing on the pin or bolt 7, and as here illustrated a bushing or bushings 10 are interposed between the inner eye and the pin 7. The pin is also formed hollow for receiving a lubricant and has radial outlet ducts 11ª for permitting the lubricant to pass to the bearing surfaces between the pin and the bushing. The members 5, 6 are clamped snugly against the edges of the outer eye 3 by means of a head 11 on one end of the pivot 7 and thrusting against one of the members as 6 and a nut 12 on the other end and thrusting against the other member 5. The pin is held from turning and the nut held from turning by suitable locking means or washers 13 and 14.

Means is provided for holding the members 5, 6 from clamping against the end edges of the inner eye 4, this means being shown as shims 15 interposed between the end edges of the outer eye 3 and the bottom of the grooves 8. The shims are located and as many of them used as desired, to maintain a small clearance between the opposite ends of the inner eye 4 and the members 5, 6.

As seen in Figure 4, a rubber bushing may be used instead of the metal bushings 10 and when a rubber bushing is used, no lubricant is required.

The rubber bushing preferably consists of two sections 16, 17 sleeved on the pin 18 and having heads 19, 20 at their outer ends thrusting against the opposing clamping members 21, 22 corresponding to members 5, 6 and overlying the edges of the inner eye 23 corresponding to the eye 4. Thus, when the members 21, 22 are clamped by tightening the nut 24 on the pin 18, the rubber bushing will be compressed endwise and owing to the heads 19, 20 a metal to metal contact between the inner eye 23 and the clamping members 21, 22 is avoided and also no shims 15 are used. Preferably, the heads are formed conical as at 25 and the clamping members 21, 22 are formed with complemental conical sockets 26. This construction causes the margins 27 of the heads to be compressed against the edge of the inner eye 23. The pin 18 is shown as fluted at 28 to coact with the bore of the member 22 to hold the pin from turning and the nut 24 is a castle nut and locked from turning on the pin by the usual key.

In operation, due to the clamping members 5, 6 clamped tightly onto the eye 3, all pivotal movement takes place about the pin 7 and there is no frictional engagement between the inner and outer eyes.

This spring joint is particularly advantageous in that the pivotal movement is confined to one locality which can be readily lubricated or if not lubricated can be rubber bushed at one point to dispense with rubber bushings in a plurality of points.

What we claim is:

1. In an elliptical leaf spring, the combination of upper and lower leaf springs, the main leaves of the springs having eyes at their ends, said eyes being arranged concentric, a pivot extending through the inner eye and the inner eye having a bearing on said pivot and means mounted on the pivot and coacting with the outer eye and spaced apart from the inner eye to hold the outer eye off the periphery of the inner eye.

2. In an elliptical leaf spring, the combination of upper and lower leaf springs, the main leaves of the springs having eyes at their ends, said eyes being arranged concentric, a pivot extending through the inner eye and the inner eye having a bearing on said pivot and clamping members mounted on the pivot and thrusting against the side edges of the outer eye and clearing the side edges of the inner eye, the pivot having means for clamping said members against the outer eye.

3. In an elliptical leaf spring, the combination of upper and lower leaf springs, the main leaves of the springs having eyes at their ends, said eyes being arranged concentric, a pivot extending through the inner eye and the inner eye having a bearing on said pivot and clamping members mounted on the pivot and thrusting against the side edges of the outer eye and clearing the side edges of the inner eye, the pivot having means for clamping said members against the outer eye, and said members being formed with seats for the outer eye for holding the outer eye from resting on the periphery of the inner eye.

4. In an elliptical leaf spring, the combination of upper and lower leaf springs, the main leaves of the springs having eyes at their ends, said eyes being arranged concentric, a pivot extending through the inner eye and the inner eye having a bearing on said pivot and clamping members mounted on the pivot and thrusting against the side edges of the outer eye, the pivot having means for clamping said members against the outer eye, and said members being formed with seats for the outer eye for holding the outer eye from resting on the periphery of the inner eye, and means for preventing the clamping members from clamping on the edges of the inner eye.

5. In an elliptical leaf spring, the combination of upper and lower leaf springs, the main leaves of the springs having eyes at their ends, said eyes being arranged concentric, a pivot extending through the inner eye and the inner eye having a bearing on said pivot, discoidal members mounted on the pivot and having seats in their opposing faces for the edge portions of the outer eye, the pivot having means for clamping said members against the edges of the outer eye, and means for preventing the clamping members from clamping on the edges of the inner eye.

6. In an elliptical leaf spring, the combination of upper and lower leaf springs, the main leaves of the springs having eyes at their ends, said eyes being arranged concentric, a pivot extending through the inner eye, a resilient bushing between the pivot and the inner eye having heads at their ends overlying the edges of the inner eye, clamping members mounted on the pivot having seats for the edge of the outer eye, the clamping members thrusting against the heads of the bushing.

In testimony whereof, we have hereunto signed our names, at Syracuse, in the county of Onondaga, and State of New York, this 31st day of October, 1930.

ROGER W. HASTINGS.
MARK HARRIS.